US010876565B2

(12) United States Patent
Henke et al.

(10) Patent No.: US 10,876,565 B2
(45) Date of Patent: Dec. 29, 2020

(54) SELF-PIERCING RIVET

(71) Applicant: BÖLLHOFF VERBINDUNGSTECHNIK GmbH, Bielefeld (DE)

(72) Inventors: Dennis Henke, Rheda-Wiedenbrueck (DE); Mathias Heger, Oerlinghausen (DE)

(73) Assignee: Böhoff Verbindungstechnik GmbH, Bielefeld (DE)

( * ) Notice: Subject to any disclaimer, the term of this patent is extended or adjusted under 35 U.S.C. 154(b) by 967 days.

(21) Appl. No.: 15/116,384

(22) PCT Filed: Feb. 4, 2015

(86) PCT No.: PCT/EP2015/052331
§ 371 (c)(1),
(2) Date: Aug. 3, 2016

(87) PCT Pub. No.: WO2015/118027
PCT Pub. Date: Aug. 13, 2015

(65) Prior Publication Data
US 2017/0009794 A1 Jan. 12, 2017

(30) Foreign Application Priority Data
Feb. 4, 2014 (DE) .......... 10 2014 201 976

(51) Int. Cl.
*F16B 5/04* (2006.01)
*F16B 19/08* (2006.01)
*B21J 15/02* (2006.01)

(52) U.S. Cl.
CPC .......... *F16B 19/086* (2013.01); *B21J 15/025* (2013.01); *F16B 5/04* (2013.01)

(58) Field of Classification Search
CPC .......... F16B 19/086; F16B 5/04; B21J 15/025
(Continued)

(56) References Cited

U.S. PATENT DOCUMENTS 7,104,719 B2 * 9/2006 Fussnegger ........... F16B 5/0096
403/272
7,284,319 B2 * 10/2007 Kato ...................... B21J 15/025
29/243.53

(Continued)

FOREIGN PATENT DOCUMENTS

| CN | 102483084 A | 5/2012 |
| CN | 103008523 A | 4/2013 |

(Continued)

OTHER PUBLICATIONS

T. Kato, et al. Plastic Joining of Dissimilar Material of High Tensile Strength Steel and Aluminium Alloy Sheets, Welding International, Sep. 2008, 7 pages, vol. 22, No. 9, XP001570847.

(Continued)

*Primary Examiner* — Matthew R McMahon
(74) *Attorney, Agent, or Firm* — Reising Ethington P.C.; Matthew J. Schmidt

(57) ABSTRACT

A self-piercing rivet for producing a joining connection between at least two components, which comprises the following features: a rivet head and a rivet shank having a central shank bore, wherein the rivet shank comprises a cylindrical shank outer surface and a shank inner surface limiting the central shank bore, and wherein the shank outer surface and the shank inner surface are connected at the axial end of the rivet shank facing away from the rivet head by a flat shank end face and a shank end radius. The shank end radius transitions tangentially into the shank inner surface and the flat shank end face is connected to the shank outer surface by a cutting edge.

21 Claims, 1 Drawing Sheet

(58) Field of Classification Search
USPC .......... 411/179, 432, 501; 72/466.5; 227/51
See application file for complete search history.

(56) References Cited

U.S. PATENT DOCUMENTS

| | | | |
|---|---|---|---|
| 7,628,573 B2 | 12/2009 | Philipskötter et al. | |
| 7,870,656 B2* | 1/2011 | Eberlein | B21J 15/025 29/525.14 |
| 8,506,228 B2 | 8/2013 | Singh et al. | |
| 8,763,233 B2 | 7/2014 | Bartig | |
| 9,091,290 B2 | 7/2015 | Singh et al. | |
| 2004/0022602 A1* | 2/2004 | Singh | B21J 15/025 411/501 |
| 2005/0008453 A1* | 1/2005 | Babej | B23P 19/062 411/500 |
| 2005/0161965 A1* | 7/2005 | Eberlein | B21J 15/025 296/29 |
| 2008/0149256 A1* | 6/2008 | Wang | B21J 15/025 156/92 |
| 2008/0232930 A1* | 9/2008 | Jokisch | F16B 19/086 411/501 |
| 2013/0248083 A1* | 9/2013 | Takahashi | B21J 15/025 156/92 |
| 2014/0290064 A1* | 10/2014 | Smeyers | B21J 15/025 29/897.2 |
| 2016/0059340 A1* | 3/2016 | Hill | B23K 35/28 428/596 |
| 2017/0113738 A1* | 4/2017 | Freis | B21J 15/36 |
| 2017/0343027 A1* | 11/2017 | Wissling | F16B 19/086 |
| 2018/0023607 A1* | 1/2018 | Rintelmann | F16B 19/00 29/525.03 |

FOREIGN PATENT DOCUMENTS

| | | |
|---|---|---|
| DE | 102005020416 A1 | 11/2006 |
| DE | 102005052360 A1 | 5/2007 |
| DE | 102006028537 B3 | 5/2007 |
| EP | 1229254 A2 | 8/2002 |
| EP | 1387093 A1 | 2/2004 |
| EP | 1950432 A1 | 7/2008 |
| EP | 2024651 B1 | 9/2009 |
| EP | 2314890 A2 | 4/2011 |
| EP | 2631022 A1 | 8/2013 |
| JP | 2004340321 | 12/2004 |
| JP | 2007254774 | 10/2007 |
| WO | WO2007132194 A1 | 11/2007 |
| WO | WO2011023616 A1 | 3/2011 |

OTHER PUBLICATIONS

Written Opinion & International Search Report for PCT/EP2015/052331 dated Apr. 29, 2015, 10 pages.
CN Office Action for CN Application No. 201580007354.1 dated Apr. 12, 2017 (8 pages).

* cited by examiner

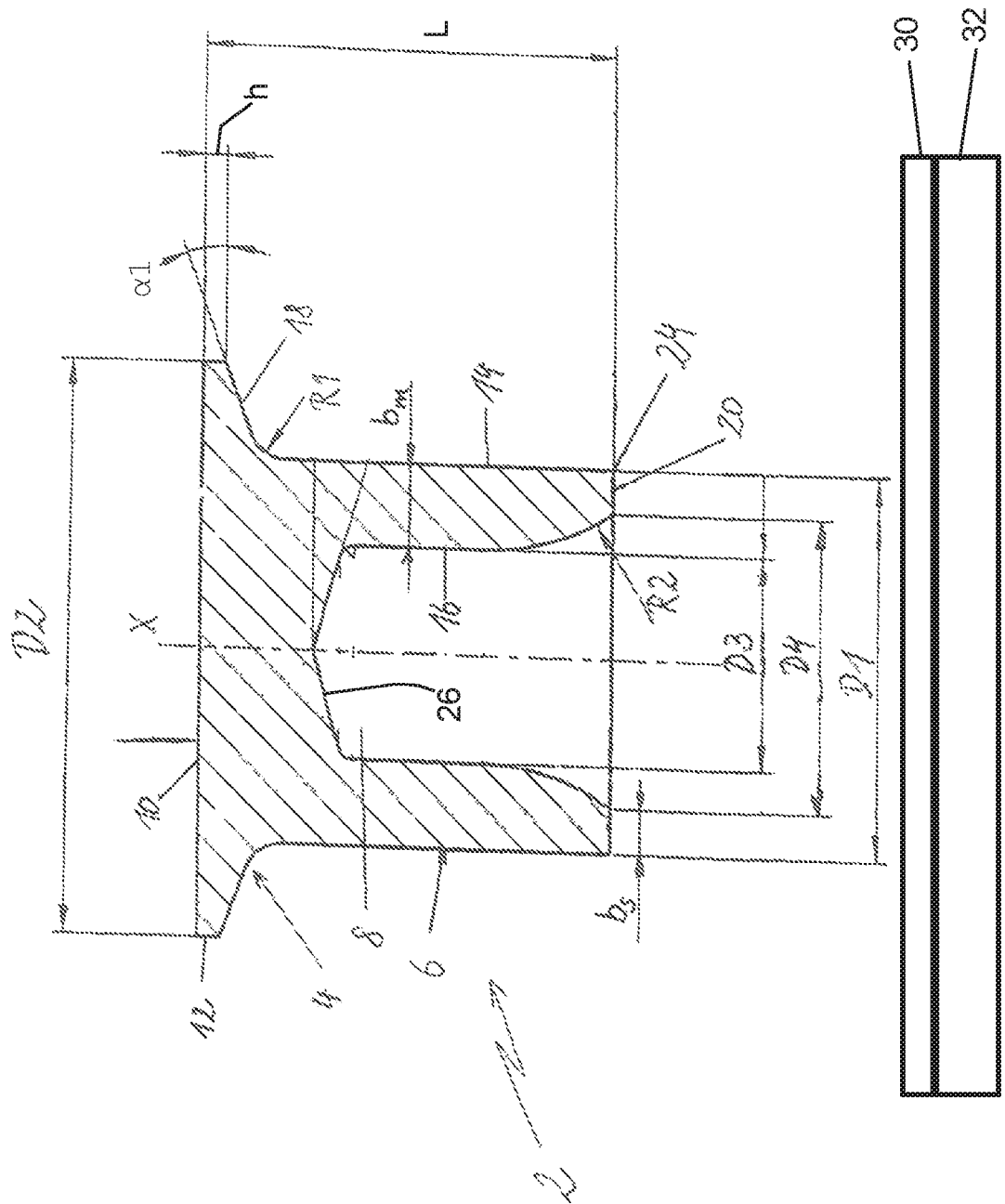

SELF-PIERCING RIVET

1. TECHNICAL FIELD

The present disclosure relates to a self-piercing rivet, in particular a semi-hollow self-piercing rivet, for the production of a joining connection between at least two components, in particular for the production of a joining connection between a component made of high-strength steel and a component made of a thick-walled aluminum sheet or cast aluminum, as well as a method therefor.

2. BACKGROUND

The punch riveting as a joining method is widely used in the industry. Especially in the manufacturing of automobiles always new demands are being placed on punch-rivet connections. This is mainly because the joining task has to be solved again and again depending on the materials that are to be combined, such as steel, high-strength steel, magnesium sheets, plastic, CFRP (carbon fiber reinforced plastic) and similar materials. In addition, the reduction of the cycle time in the manufacturing of a joining connection, the accessibility to the components that are to be joined and the space available for the connection impose always new requirements as part of a joining task.

Thus, for example, the special head geometry of the self-piercing rivet according to EP 1 950 432 A1 realizes a corrosion protection for the manufactured self-piercing rivet connection. However, due to various problems in the setting process the self-piercing rivet is not suitable for nowadays widespread high-strength materials, such as steel and aluminum alloys. It is inter alia not possible to produce a desired bonding strength reliably enough.

DE 10 2006 028 537 B3 discloses a self-piercing rivet which is suitable for the joining of joining parts made of higher-strength steels, in particular AHSS steels as well as metastable austenitic steels. The rivet foot or base of this self-piercing rivet is characterized by a small radial shank outer surface and a greater radial shank inner surface which merge tangentially into each other. Due to this construction of the rivet base the load-bearing behavior of the established punch-rivet connections is improved. However, once the self-piercing rivet is set within a connection in a lower layer in components that do not consist of higher-strength steels, the connection quality drops.

EP 1 387 093 A1 discloses a self-piercing rivet geometry which is made of aluminum or an aluminum alloy. Both the material of the self-piercing rivet and its geometry are in particular adapted to the production of self-piercing rivet connections in aluminum sheets and not to a punching through sheet metal layers of high-strength steel.

The self-piercing rivet geometry of DE 10 2005 020 416 A1 and EP 1 229 254 B1 is also adapted to the establishing of a joining connection in high-strength materials. It has shown that a conventional semi-hollow self-piercing rivet made of steel with a sharpened rivet base is unsuitable for the connection of sheets of high- and highest-strength steel. Due to the high strength of the joining parts, the reforming process of the rivet shank occurs undesirably early, so that a punching through the upper joining part is perhaps not possible. In order to address these disadvantages, a comparatively sturdier and more compact semi-hollow self-piercing rivet with a small shank cavity length was developed having a blunt formed rivet base. Also, starting at the rivet base, the radial width of the rivet shank increases distinctly in the direction of the rivet head in order to realize a sufficient stability of the self-piercing rivet. In addition, a very high rivet hardness is required so that high internal stresses and therefore a high risk of cracking are present in the connection.

In EP 2 024 651 B1, a self-piercing rivet is disclosed that has sufficient axial stability in particular for punching in high-strength steels. For this purpose, the rivet shank has an outer diameter of 5.5 mm and an inner diameter of 2.9 mm. The rivet base is formed blunt due to a flat shank end face. In order to support the stability of the rivet shank due to its radial width, the shank end face transitions or passes radially inwardly tapered into the shank bore of the self-piercing rivet. It is the combination of these features that realizes the adequate stability for establishing a joining connection in sheets of high-strength steel. However, here also high internal stresses are generated in the connection due to the rivet form. Particularly in the material connection of high-strength steel sheet with an aluminum sheet arranged below they lead to an increased risk of cracking and thus to an associated higher probability of failure.

DE 10 2005 052 360 A1 also discloses a self-piercing rivet for producing or establishing a joining connection in high-strength steel sheets. In contrast to WO 2007/132194 A1 the rivet shank is formed less stable here. Because the disclosed self-piercing rivet has an outer diameter of the rivet shank of 5.3 mm and an inner diameter of the rivet shank of 3.4 mm. Despite the lower radial width of the rivet shank the self-piercing rivet has a sufficient axial stability, which is achieved by means of the special cutting geometry at the rivet base. The rivet base is therefore formed out of a flat or slightly inclined shank end face which is limited radially outwardly by a smaller conical cutting edge and radially inwardly by a larger tapered shank inner chamfer.

The above described geometries of self-piercing rivets are adapted to the joining connections in high-strength components or aluminum components. However, such self-piercing rivets do not give satisfactory results when a joining connection is to be established in components of different materials with a high strength top layer.

The object of at least certain implementations of the present invention is therefore to provide a self-piercing rivet for joining components which provides satisfying results especially for producing or establishing a joining connection in a component combination with a high-strength top layer.

3. SUMMARY

The above mentioned object may be achieved by the self-piercing rivet, by a joining method for this rivet into a high-strength top layer and an underlying aluminum part and by a joining connection. Advantageous embodiments and further developments of this self-piercing rivet result from the following description, the accompanying drawings and the appending claims.

The self-piercing rivet for producing a joining connection between at least two components has the following features: a rivet head and a rivet shank having a central shank bore, which are preferably formed rotationally symmetric with respect to a central axis, wherein the rivet head comprises an upper side with a predetermined head diameter. The rivet shank comprises a cylindrical shank outer surface and a shank inner surface limiting the central shank bore, wherein the shank outer surface and the shank inner surface are connected on the axial end of the rivet shank facing away from the rivet head by a flat shank end face and a shank end radius. The shank end radius transitions or merges tangentially into the shank inner surface and the flat shank end face is connected to the shank outer surface by a cutting edge, wherein a ratio of maximum radial width $b_m$ of the rivet shank to the radial end face width $b_s$ is in the range of $1.5 \leq b_m/b_s \leq 2.5$. It is also preferred, to form the self-piercing rivet not rotationally symmetrical with respect to its central axis, but oval, elliptical or shaped otherwise.

The formed self-piercing rivet is characterized by its special geometry in the rivet shank portion in combination with the rivet base portion. Due to the specific geometry of the rivet shank, the self-piercing rivet is given sufficient axial stability for punching through a high-strength top layer. At the same time, the construction of the rivet base provides a sufficiently blunt geometry to penetrate the high-strength top layer with a sufficiently sharp or acute geometry for entering a softer further material layer compared to the high-strength top layer. Furthermore, by means of the radial widening of the rivet shank starting at the rivet base portion in the direction of the rivet head, it is ensured that the rivet spreads open radially sufficiently when establishing the joining connection so that at the same time the slug punched out of the high-strength material presents less of an obstacle for producing the joining connection. At the same time, the rivet shank is preferably not spread so far that an excessive upsetting or bulging of the rivet occurs by means of a penetration resistance generated by the component. Thus, the good joining properties of the self-piercing rivet are achieved especially by the radial width of the rivet shank varying in the axial direction and by the rivet base geometry consisting of flat shank end face and radially inwardly extending circular arc shaped connection surface in the direction of the shank inner surface.

According to at least one embodiment of the self-piercing rivet, the shank radius is at least twice as large as the maximum radial width $b_m$ of the rivet shank. This geometric configuration ensures that the shank end face is connected to the shank inner surface with a sufficiently large circular arc. In this manner, a smooth continuous transition from the shank end face into the interior of the rivet shank is formed which influences especially the interaction between the self-piercing rivet and the punched-out punch slug positively.

According to another embodiment, the rivet head has an outer edge of the head which is connected to the shank outer surface by a conical underhead chamfer and an underhead radius, wherein the underhead radius respectively transitions or merges tangentially into the conical underhead chamfer and into the shank outer surface, while the conical underhead chamfer encloses with a radial plane of the self-piercing rivet an angle $\alpha_1$ of 20±2°.

During the production of a joining connection the rivet head elastically deforms the top layer and anchors at the same time in the underlying material by means of a rivet shank spreading open. Once the joining punch relieves the rivet head, the self-piercing rivet is subject to certain inner tensile stresses since the top layer springs back. By means of the advantageous embodiment of the rivet head and in particular the conical under-head chamfer with respect to the radial plane of the self-piercing rivet, the top layer is less elastically deformed during joining and leads thus to lower tensile stresses within the self-piercing rivet after establishing the joining connection.

According to a further embodiment, a ratio of the head diameter D2 to a shank diameter D1 is in the range of $1.44 \leq D2/D1 \leq 1.54$. It is further preferred for the head diameter D2=7.75±0.15 mm, for the shank diameter D1=5.2±0.1 mm and for the radial shank end face width $b_s$=0.6±0.1 mm. In this context, it is also preferable that the shank radius is R2=3 mm. According to a further embodiment the minimum diameter D3 of the shank bore is 2.9±0.1 mm, while the rivet head has an axial height of the head outer surface of 0.3±0.1 mm. In summary, it is preferable to form the self-piercing rivet as semi-hollow self-piercing rivet having the central bore formed as a blind hole.

The present disclosure also comprises a method for producing a joining connection and a joining connection between at least a first and a second component. This joining method is characterized by the fact that one of the above described self-piercing rivets is set in the first and second component. The components are arranged one above the other, wherein the first component is a top layer made of high-strength steel and the second component is an aluminum part. According to at least one embodiment, the second component comprises a thickness in the joining direction which is at least 1.5-times, preferably more than 2 to 4-times, of a thickness of the first component in the joining direction. It is also preferred that the second component consists of a cast aluminum or a die-cast aluminum material.

4. DETAILED DESCRIPTION OF THE DRAWINGS

The present disclosure is explained in more detail with reference to the accompanying drawing. The sole FIGURE shows an axial sectional view of a self-piercing rivet in an un-joined state.

5. DETAILED DESCRIPTION

By means of the accompanying drawing, a specific example of a realization of a semi-hollow self-piercing rivet is described. The self-piercing rivet is particularly suitable for establishing a joining connection between at least a first component 30 of high-strength steel as a top layer and a further component 32 of a thick-walled aluminum sheet or of a cast aluminum or die-cast aluminum material as component on the die side. It is understood that the self-piercing rivet can also be used for the production of joining connections in other materials.

The self-piercing rivet 2 is formed rotationally symmetrical with respect to a central axis X and consists of a rivet head 4 and a rivet shank 6. It is also preferred to form the rivet 2 not rotationally symmetric to its central axis X. In this case, the self-piercing rivet 2 has transverse to its central axis X preferably an elliptical or oval shape. The rivet shank 6 has a central bore which is formed as a blind bore. The rivet head 4 has an upper side 10 which is preferably formed flat. Adjacent to the upper side 10 the rivet head 4 is limited by a head outer surface 12, which is formed cylindrically. The head outer surface 12 has a diameter D2 and an axial height h. The rivet shank 6 adjoining the rivet head 4 has a cylindrical shank outer surface 14 and a cylindrical shank inner surface 16. The shank inner surface 16 limits the bore 8 of the self-piercing rivet 2. The cylindrical shank outer surface 14 has a diameter D1 and the cylindrical shank inner surface has a diameter D3. The shank outer surface 14 is formed for certain applications at least partly slightly diverging in order to minimize the gap formation between the joined components.

The cylindrical head outer surface 12 is connected to the cylindrical shank outer surface 14 by means of a conical under-head chamfer 18 and a radius R1. In the present context the term "radius" is to be understood as an annular surface which has the shape of a circular arc with the radius R in an axial section. The circular arc defined by the radius R1 extends respectively tangentially in the under-head chamfer 18 and in the shank outer surface 14. In addition, the under-head chamfer 18 directly adjoins the head outer surface 12. The transition between under-head chamfer 18 and head outer surface 12 is also realized by means of a circular arc having a certain radius or angled. In addition, the under-head chamfer 18 encloses an angle $\alpha_1$ of 20±2° with a radial plane of the self-piercing rivet 2.

In the region of the rivet basis, the shank outer surface 14 is connected to the shank inner surface 16 by means of a flat shank end face 20 and a circular arc. The circular arc is defined by a radius R2 extending tangential into the shank inner surface 16 starting at the shank end face 20. The flat shank end face 20 extends perpendicular to the longitudinal axis X of the self-piercing rivet 2. In addition, the shank end face 20 transitions into the shank outer surface 14 via the cutting edge 24 formed angled and radially circumferential. The cutting edge 24 is therefore formed sharp-edged. The bore 8 has an arched groove base 26 in the under-head region formed by a surface which is inclined radially circumferential about the longitudinal axis X. This surface is arranged at an angle of 105±5° with respect to the longitudinal axis X. The transition from this angularly arranged plane into the shank inner surface 16 occurs via a circular arc.

Due to the arc-shaped transition from the shank end face 20 into the bore 8 of the self-piercing rivet 2, the shank inner surface 16 is not formed cylindrical over the complete axial length of the rivet shank 6. Rather, a radial width of the rivet shank 6 steadily increases in the axial direction of the rivet head 4 and starting from the shank end face 20. The maximum width $b_m$ of the rivet shank 6 is reached within the cylindrically extending portion of the shank inner surface 16. The maximum radial width of the rivet shank 6 is designated as $b_m$. The minimum radial width $b_s$ of the rivet shank 6 is present in the portion of the shank end face 20. This minimum radial width corresponds to the shank end face width. Due to this geometry of the rivet shank 6, the bore 8 has the diameter D3 in its cylindrical portion or adjacent to the rivet head 4. The largest diameter of the bore 8 is reached at the end of the rivet shank 6 facing away from the rivet head 4. It is designated with D4.

According to at least one embodiment, the self-piercing rivet 2 has the following dimensions:

$D1 = 5.2 \pm 0.1$ mm $D2 = 7.75 \pm 0.15$ mm $D3 = 2.9 \pm 0.1$ mm $D4 = 4.0$ mm $h = 0.3 \pm 0.1$ mm $L = 5.5 \pm 0.15$ mm $b_m = 1.15 \pm 0.1$ mm $b_s = 0.6 \pm 0.1$ mm $R1 = 0.5 \pm 0.1$ mm $R2 = 3$ mm $\alpha_1 = 20 \pm 2°$ An axial length L of the self-piercing rivet 2 is 5.5±0.15 mm in the shown example of a realization. It is also preferred to use other rivet lengths L of more or less than 5 mm with otherwise identical dimensions of the self-piercing rivet 2.

Due to its geometry, the self-piercing rivet 2 is especially suitable for the connection of a top layer of high-strength steel with a thick-walled aluminum layer arranged on the die side. It is preferred that further material layers are arranged between the top layer of high-strength steel and the aluminum layer on the die side. The self-piercing rivet 2 has proven to be particularly advantageous in the production of a joining connection of high-strength steel as top layer and a layer of a cast aluminum material on the die side. In this context, it is preferred that the component made of aluminum or cast aluminum material has a thickness in joining direction that corresponds at least 1.5-times, preferably more than 2 to 4 times, the thickness of the top layer in joining direction.

During aluminum casting, aluminum is melted down, e.g. in the form of various intermediate alloys. Subsequently, characteristics of the aluminum melt can be influenced by adding different alloying elements. These characteristics are hardness, vibration absorption, toughness and machinability for the mechanical processing. As alloying additions for engine cases and transmission cases preferably the elements: copper, silicon, magnesium, and others are qualified. Various methods are known for casting. Due to a low melting point, aluminum/aluminum alloys can be processed in die casting, which is used among others in the automotive industry. Here, for example engine blocks, pump cases, cylinder heads as well as chassis components and transmission cases are manufactured.

Aluminum die-casting refers to a die-casting process, in which aluminum is pressed in the liquid or pasty state under high pressure into a preheated mold. It displaces the air being present in the form and is held under pressure during the solidification process. The die-set, preferably made of steel, is the exact negative of the casting to be manufactured enlarged by the degree of shrinkage. The form consists of at least two parts (if necessary additional sliders), so that it can be opened after the filling process and solidification of the metal and the casting can be removed therefrom.

The development of this new self-piercing rivet geometry was necessary because a high risk of cracking has been generated with conventional semi-hollow self-piercing rivets both in the deformed aluminum component as well as in the necessarily very high-strength self-piercing rivet. The geometry of the self-piercing rivet reduces, however, the residual or internal stresses in the aluminum component generated by the joining connection compared to conventional self-piercing rivets. In addition, lower compression forces occur within the self-piercing rivet 2 during the joining process, which also results in lower residual stresses, especially tensile stresses in the longitudinal direction of the self-piercing rivet 2, in the set self-piercing rivet 2. In this context it should be emphasized that the top layer made of high-strength steel preferably has a strength in the range of 800-1.100 MPa. Of course, it is also preferred to connect top layers having a higher or lower strength. At higher strengths of the top layer, the strength of the self-piercing rivet must be increased accordingly. It is also possible to reduce the strength of the self-piercing rivet in case of lower strengths of the top layer compared to the given range.

According to at least one embodiment, a joining connection is created, by means of the self-piercing rivet 2, between a high-strength steel component with a thickness of 1.6 mm as upper top layer and a cast aluminum part in the T6-condition (i.e. solution annealed and artificially aged to increase the strength) as lower layer. The self-piercing rivet 2 is therefore preferably realized only in one strength class or with one strength which is slightly higher than the strength of the top layer. In this context, it is also preferred to process aluminum parts in other after-treatment conditions, such as for example T4, T5 or T7.

The joining of high-strength steels as top layer and thicker cast aluminum materials as die layer requires that the high-strength steel of the top layer is punched through and also a reliable connection is created in the cast aluminum material. Due to the shape of the self-piercing rivet 2, the deformation and mechanical stress within the self-piercing rivet must be kept so low that the mechanical stresses stored in the self-piercing rivet 2 do not lead to a failure of the self-piercing rivet 2. At it, the self-piercing rivet 2 is especially stressed during the joining process in that it pushes the slug, which is punched out of the high-strength top layer, figuratively in front of it. Due to the poor deformability of the slug because of the high strength of the top layer, it can enter or be formed into the interior of the bore 8 of the self-piercing rivet 2 only in a limited manner based on the rivet constructions and setting methods known up to now.

In order to guarantee the punching through of the top layer by the self-piercing rivet 2 during the joining process, the punch surface has been adapted compared with conventional self-piercing rivets so that the punching behavior of the self-piercing rivet 2 could be improved in comparison to the prior art. Furthermore, the circular arc shaped transition from the shank end face into the bore 8 provides a sliding of the shank end face facing away from the head or of the cutting edge of the self-piercing rivet 2 on the slug. This makes it also possible to use flatter dies for the joining task compared to the prior art so that despite of the deformation of the rivet base or the rivet shank 6 in the cast aluminum material a risk of crack formation is reduced and a closing head is formed which has a lower height.

For reducing also the tensile stresses which are stored in the self-piercing rivet 2 after the joining process, the taking-in of the upper metal sheet layer during the joining process has been reduced specifically. For this purpose, the under-head chamfer 18 comprises the angle $\alpha_1$ of 20±2° in comparison to the radial plane of the self-piercing rivet. Furthermore, it is in this context positive that the rivet head 4 has only a height h of 0.3±0.1 mm. Especially, this geometric construction of the self-piercing rivet 2 reduces the taking-in of the upper metal sheet layer, preferably the top layer of high-strength steel. The reduction of the tensile stresses stored in the joined self-piercing rivet following therefrom has a positive effect on the strength of the joining connection especially at dynamic loading of the established joining connection. Due to the above-described consequences of the geometry of the self-piercing rivet 2, it is also preferable to produce the self-piercing rivet 2 in comparison to the prior art with a lower hardness. From this, the positive side effect follows that also the risk of crack formation within the self-piercing rivet 2 is reduced after establishing the joining connection.

From the above discussed geometric features of the self-piercing rivet 2 it follows therefore that especially the geometry of the rivet base, i.e. the cooperation of the cutting edge 24, the shank end face 20 and the circular arc shaped transition in the bore 8, results in a more effective punching operation with lesser deformation. The lower deformation results from the fact that the rivet pulls in a smaller punching sinkhole or funnel in the top layer during the joining process compared to conventional self-piercing rivets. Due to the less deep punching funnel, the rivet head 4 can be made flatter and thus as a countersunk and can be realized compared with the prior art with a smaller transition angle and with a smaller radius between the conical under-head chamfer 18 and the shank outer surface 14. Since the top layer is moved less into a punching funnel during the joining process, it has after completion of the joining process and removing of the setting punch or male die also a lower tendency to spring back to its initial position. Thus, the relatively flat countersunk head of the self-piercing rivet 2 creates due to the reduced deformation of the top layer also a lower storage of mechanical tensile forces within the set self-piercing rivet 2 compared to the prior art.

Further, the circular arc shaped and thus continuous transition from the cutting edge 24 and the shank end face 20 into the interior of the bore 8 causes a lower resistance of the punch slug (not shown) at the entering into the bore 8 during the joining operation. This also has the consequence that the self-piercing rivet 2 has a lower resistance at its entering into the aluminum or cast aluminum layer on the die side during the joining process. Thus, the rivet 2 is less compressed during the joining process and expanded only later in its shank portion 6.

In addition, the circular arc shaped course of the transition from the inner cutting edge at the shank end face 20 into the hole 8 supports the directed spreading of the self-piercing rivet 2 during the joining process. Indeed, whereas the rivet shank 6 is relatively little deformed in its cylindrical portion with maximum radial width $b_m$, the portion of the rivet shank 6 tapering towards the shank end face 20 is spread radially outwardly. This deformability supported by the selective variation of the radial width of the rivet shank 6 supports the formation of the undercut in the aluminum layer on the die side in a way that results in lower mechanical internal stresses in the self-piercing rivet 2 and a lower notch effect in the established joining connection compared to the self-piercing rivets known from the prior art. Due to these joining characteristics of the self-piercing rivet 2, it is possible to use a flatter die as a counter bearing adjacent to the aluminum or cast aluminum layer. This results, however, in higher internal stresses in the self-piercing rivet due to the greater deformation of the rivet base in a flat die but in the deformed aluminum sheet, lower internal stresses are created. This reduces in particular the risk of cracking in cast aluminum materials which is especially relevant for layers or component walls of cast aluminum material. Because cast aluminum materials generally have a higher tendency to crack as rolled or drawn aluminum material.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. A self-piercing rivet for producing a joining connection between at least two components, having the following features:
   a. a rivet head and a rivet shank having a central shank bore, wherein the rivet head has an upper side having a predetermined head diameter,
   b. the rivet shank comprises a cylindrical shank outer surface and a shank inner surface limiting the central shank bore, c. the shank outer surface and the shank inner surface are connected at the axial end of the rivet shank facing away from the rivet head by a flat shank end face and a shank end radius, wherein the shank end radius transitions tangentially into the shank inner surface and is at least twice as great as the maximum radial width $b_m$ of the rivet shank, and the flat shank end face is connected to the shank outer surface by a cutting edge, wherein d. a ratio of maximum radial width $b_m$ of the rivet shank to the radial shank end surface width $b_s$ is in the range of $1.5<b_m/b_s<2.5$.

2. The self-piercing rivet according to claim 1, wherein the rivet head comprises a head outer edge connected to the shank outer surface by a conical under-head chamfer and by an under-head radius, wherein the under-head radius transitions respectively tangentially into the conical under-head chamfer and the shank outer surface, while the conical under-head chamfer encloses with a radial plane of the self-piercing rivet an angle $\alpha_1$ of 20±2°.

3. The self-piercing rivet according to claim 2, wherein a ratio of the head diameter to a shank diameter is in the range of $1.44 \le D2/D1 \le 1.54$.

4. The self-piercing rivet according to claim 3, wherein the head diameter is 7.75±0.15 mm, the shank diameter is 5.2±0.1 mm, and the radial shank end face width is 0.6±0.1 mm.

5. The self-piercing rivet according to claim 2, wherein the shank end radius is 3±0.1 mm.

6. The self-piercing rivet according to claim 2, wherein the minimum diameter of the shank bore is 2.9±0.1 mm.

7. The self-piercing rivet according to claim 2, wherein the rivet head has an axial height of a head outer surface of 0.3±0.1 mm.

8. The self-piercing rivet according to claim 2, wherein it is constructed as semi-hollow self-piercing rivet, in which the central bore is a blind bore.

9. The self-piercing rivet according to claim 1, wherein a ratio of the head diameter (D2) to a shank diameter (D1) is in the range of $1.44 \le D2/D1 \le 1.54$.

10. The self-piercing rivet according to claim 9, wherein the head diameter (D2) is 7.75±0.15 mm, the shank diameter (D1) is 5.2±0.1 mm, and the radial shank end face width ($b_s$) is 0.6±0.1 mm.

11. The self-piercing rivet according to one claim 1, wherein the shank end radius is 3±0.1 mm.

12. The self-piercing rivet according to claim 1, wherein the minimum diameter of the shank bore is 2.9±0.1 mm.

13. The self-piercing rivet according to claim 1, wherein the rivet head has an axial height of a head outer surface of 0.3±0.1 mm.

14. The self-piercing rivet according to claim 1, wherein the self-piercing rivet is constructed as a semi-hollow self-piercing rivet, in which the central bore is a blind bore.

15. A joining connection consisting of at least a first component and a second component, wherein the first component is a top layer made of high strength steel and the second component is an aluminum part, which are connected to each other a self-piercing rivet according to claim 1.

16. The joining connection according to claim 15, in which the second component has a thickness in the joining direction which is at least 1.5-times a thickness of the first component in the joining direction.

17. The joining connection according to claim 15, wherein the second component consists of a cast aluminum or a die-cast aluminum material.

18. Method for producing a joining connection between at least a first and a second component, comprising the following steps:
setting a self-piercing rivet according to claim 1 into the first and the second component, which are arranged one above the other, wherein the first component is a top layer made of high strength steel and the second component is an aluminum part.

19. Method according to claim 18, in which the second component has a thickness in the joining direction which is at least 1.5-times a thickness of the first component in the joining direction.

20. Method according to claim 18, in which the second component consists of a cast aluminum or a die-cast aluminum material.

21. A self-piercing rivet for producing a joining connection between at least two components, having the following features:

a. a rivet head and a rivet shank having a central shank bore, wherein the rivet head has an upper side having a predetermined head diameter, b. the rivet shank comprises a cylindrical shank outer surface and a shank inner surface limiting the central shank bore, c. the shank outer surface and the shank inner surface are connected at the axial end of the rivet shank facing away from the rivet head by a flat shank end face and a shank end radius, wherein the shank end radius transitions tangentially into the shank inner surface and is at least twice as great as the maximum radial width $b_m$ of the rivet shank, and the flat shank end face is connected to the shank outer surface by a cutting edge, wherein d. a ratio of maximum radial width $b_m$ of the rivet shank to the radial shank end surface width $b_s$ is in the range of $1.5<b_m/b_s<2.5$, and e. the rivet head comprises a head outer edge connected to the shank outer surface by a conical under-head chamfer and by an under-head radius, wherein the under-head radius transitions respectively tangentially into the conical under-head chamfer and the shank outer surface, while the conical under-head chamfer encloses with a radial plane of the self-piercing rivet an angle al of 20+20, wherein f. the shank diameter D1 is 5.2±0.1 mm, the head diameter D2 is 775±0.15 mm, the minimum diameter D3 of the shank bore is 2.9±0.1 mm, the largest diameter D4 of the shank bore is 4.0 mm, g. the rivet head has an axial height h of a head outer surface of 0.3±0.1 mm and the axial length of the rivet is 5.5±0.15 mm, h. the maximum radial width $b_m$ of the rivet shank is 1.15+0.1 mm and the radial shank end face width $b_s$ is 0.6+0.1 mm, i. the under-head radius R1 is 0.5±0.1 mm and the shank end radius R2 is 3 mm, and j. the self-piercing rivet is constructed as a semi-hollow self-piercing rivet, in which the central bore is a blind bore.

* * * * *

UNITED STATES PATENT AND TRADEMARK OFFICE
CERTIFICATE OF CORRECTION

PATENT NO. : 10,876,565 B2
APPLICATION NO. : 15/116384
DATED : December 29, 2020
INVENTOR(S) : Dennis Henke et al.

Page 1 of 1

It is certified that error appears in the above-identified patent and that said Letters Patent is hereby corrected as shown below:

On the Title Page

Item (73) Assignee: delete "Böhoff" and insert --Böllhoff--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*